Figures 1, 2:
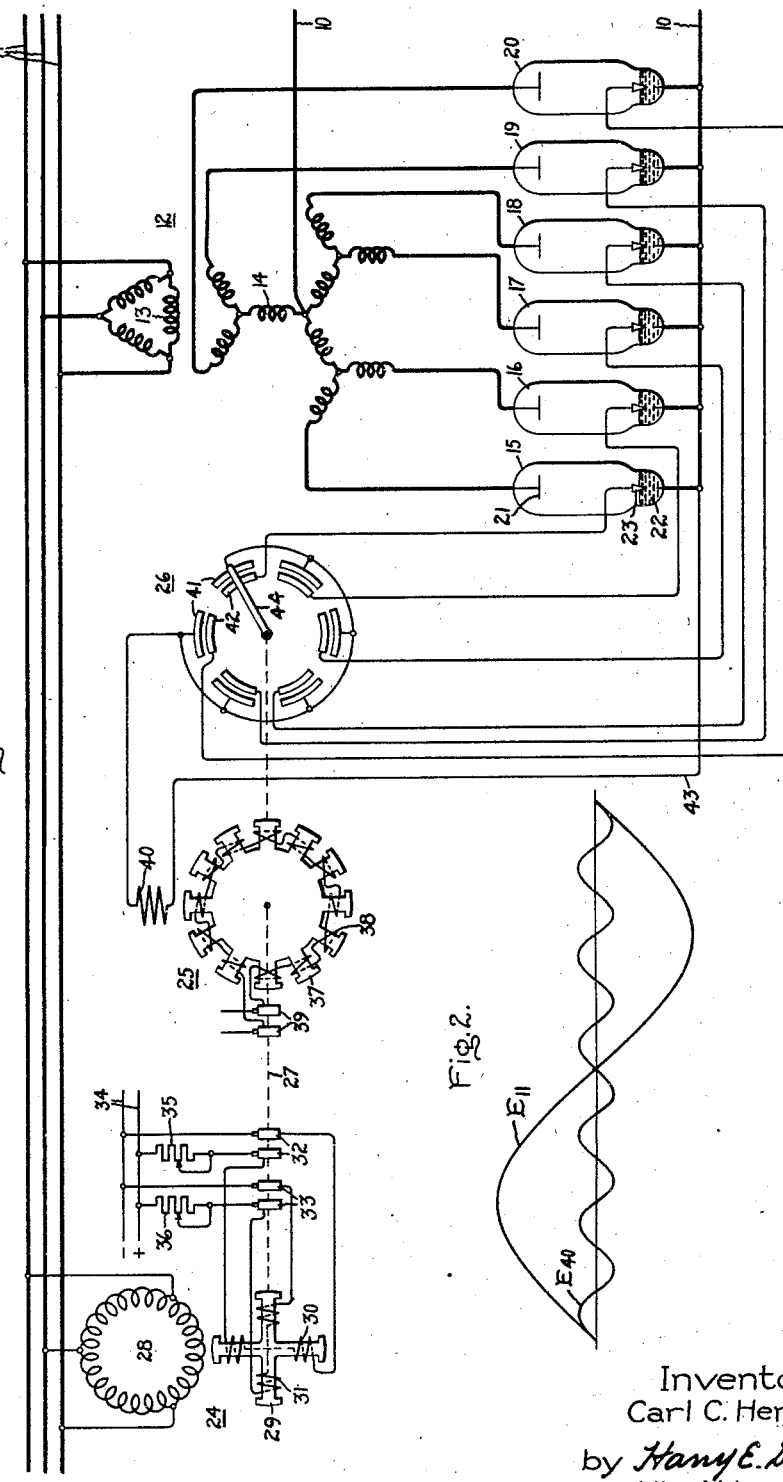

July 7, 1942.

C. C. HERSKIND 2,289,119

ELECTRIC VALVE CONTROL CIRCUIT

Filed March 26, 1941

Inventor:
Carl C. Herskind,
by Harry E. Dunham
His Attorney.

Patented July 7, 1942

2,289,119

UNITED STATES PATENT OFFICE 2,289,119

ELECTRIC VALVE CONTROL CIRCUIT

Carl C. Herskind, Schenectady, N. Y., assignor to General Electric Company, a corporation of New York Application March 26, 1941, Serial No. 385,275

7 Claims. (Cl. 175—363)

My invention relates to electric valve circuits and more particularly to control or excitation circuits for electric valve means of the type employing ionizable mediums such as gases or vapors.

In electric valve systems it is frequently desirable to utilize electric valves of the type having immersion-igniter control members or make-alive electrodes. In this type of electric valve means a control member is associated with a cathode and preferably has an extremity of a control member extending into the cathode which may be a mercury pool. The immersion-igniter control member is preferably constructed of a material having an electrical resistivity which is large compared with that of the associated cathode, and an arc discharge is established between the anode and cathode of the electric valve means by transmitting through the control member to the cathode a current of predetermined value sufficient to establish at the surface of the mercury a potential gradient of proper magnitude to effect ionization of the mercury vapor. In accordance with the teachings of my invention described hereinafter, I provide a new and improved control circuit for electric valve apparatus of the above described type.

It is an object of my invention to provide a new and improved electric control circuit.

It is another object of my invention to provide a new and improved excitation circuit for electric discharge valves.

It is a further object of my invention to provide a new and improved control circuit for electric valve apparatus of the type employing an immersion-igniter type control member in which the life of an electric valve is substantially increased by reduction of the current which the immersion-igniter control is required to transmit and which is characterized by its simplicity and reliability in operation.

In accordance with the illustrated embodiment of my invention, I provide a control or excitation circuit for electric valve means employing an immersion-igniter control member which interconnects an alternating current and a direct current circuit. The conductivities of the electric valves are controlled by means of a circuit which produces an alternating voltage which is a harmonic of the alternating current circuit interconnected by the electric valve apparatus, the order of the harmonic being dependent upon the effective number of phases of the electric valve apparatus. The harmonic voltage is produced by a synchronous type dynamo-electric machine which is driven by a synchronous machine having one winding thereof energized from the alternating current circuit with which the electric valves are associated. A mechanical distributor mounted on the same shaft with the synchronous motor and synchronous generator is arranged to connect the alternating current winding of the synchronous type machine with the immersion-igniter control members in succession to energize the control member with one half-wave of the harmonic current output of the synchronous generator. The motor is provided with a main field and a quadrature field which are energized from a direct current control circuit. By providing means for controlling the relative strengths of these two fields the phase position of the driving motor rotor and consequently the phase of the harmonic potentials with respect to the voltages of the alternating current circuit with which the electric valves are associated may be controlled. The distributor means is arranged so that only one half-wave of the harmonic current is supplied to each electrode and in this way the current carrying duty of the control member is substantially reduced thereby increasing the useful life of the electric valve means. The illustrated arrangement embodying applicant's invention is characterized by the use of standard equipment of simple construction and reliable operating characteristics.

My invention will be better understood by reference to the following description taken in connection with the accompanying drawing and its scope will be pointed out in the appended claims. In the drawing Fig. 1 is a schematic representation of one embodiment of my invention, and Fig. 2 illustrates the voltage waves of the alternating current circuit interconnected by the electric valve apparatus and the alternating current voltage wave of the synchronous generator.

Referring now to Fig. 1 of the drawing, I have diagrammatically illustrated my invention as applied to polyphase electric valve converter for energizing a direct current load circuit 10 from a polyphase alternating current supply circuit 11 through electric valve translating apparatus comprising a transformer 12 having a delta-connected primary winding 13 energized from the alternating current supply circuit 11, and a six-phase forked-wye secondary winding 14 with the end terminals of which are associated a plurality of electric valve means 15—20.

The electric valve means 15—20 are of the type including an envelope having an ionizable medium such as a gas or vapor contained therein and each includes an anode 21, a cathode 22 which is preferably of the self-reconstructing type, such as a mercury pool cathode, a make-alive or immersion-igniter control member 23. As is well understood by those skilled in the art, the electric valves 15—20 may be rendered conductive successively by transmitting to its associated control member current of a predetermined value.

In accordance with the teachings of my invention I provide an improved arrangement for supplying current of the required magnitude to the control electrode 23 of the valves 15—20 in succession for a limited time so that the current carrying duty of the immersion-igniter control electrode is materially reduced and the effective life of the valve means is thereby increased. In the embodiment illustrated this is accomplished by energizing the igniter from a source of harmonic voltage having a frequency equal to the frequency of the alternating current circuit 11 multiplied by the number of phases of the electric valve converting system and utilizing one-half of one cycle of the harmonic voltage for energizing each of the control members. Referring to the drawing, the particular embodiment illustrated for accomplishing this energization of the control electrodes 23 includes a synchronous type motor 24, a synchronous type generator 25 and a distributor mechanism 26. The movable elements of the motor, generator and distributor are connected to common shaft 27 so that the voltage of the generator 25 and the mechanical position of the distributor 26 bear a definite relation to the phase position of the voltage of the alternating current circuit 11. The driving motor 24 comprises a three-phase winding 28 energized from the alternating current circuit 11 and a field member 29 having pole pieces arranged in quadrature relation and energized from windings 30 and 31. The field windings 30 and 31 are connected to the slip rings 32 and 33 which are energized from a suitable source of direct current 34 through variable resistors 35 and 36, respectively. By suitable adjustment of resistors 35 and 36 the relative strength of a field produced by windings 30 and 31 may be controlled and the mechanical position of field structure 29 relative to the rotating field produced by the winding 28 may be adjusted. The alternating current generator 25 comprises a rotating field structure 37 which, in the particular arrangement disclosed, is a twelve-pole structure having a field winding 38 connected with the slip rings 39. The slip rings may be energized from any suitable source of direct current such as the circuit 34. The generator 25 is provided with a single-phase armature winding 40 in which is induced an alternating voltage having a frequency six times the frequency of the alternating current supply circuit 11 and having a definite phase relation with respect thereto. In order that successive positive half-waves of the voltage of the winding 40 may be impressed on the control members 23 of successive ones of the valves 15—20, the distributor mechanism 26 is provided with a plurality of pairs of fixed contacts 41 and 42. Fixed contacts 41 are all connected together and to one side of the armature winding 40. The other side of the armature winding is connected to the side of the direct current circuit with which the cathodes of the electric valve means 15—20 are associated by means of a conductor 43. Each of the stationary contacts 42 is connected to a different one of the control members 23 of the electric valves 15—20. The distributor mechanism 26 is provided with a movable member 44 of conducting material which is driven synchronously with the dynamo-electric machines 24 and 25 to connect together the contacts 41 and 42 of each pair in succession and thereby sequentially complete the circuit of the control electrodes of the electric valves 15—20. The stationary contacts 41 and 42 are of such a length that they are shorted by the member 44 for the duration of one half-cycle of the harmonic voltage induced in the winding 40. Thus each control electrode 43 is energized during one half-cycle only of the harmonic voltage. Inasmuch as the contacts 41 and 42 are short circuited for exactly one-half cycle of the harmonic voltage the circuits may be made and broken at current and voltage zero.

In Fig. 2 the voltage of one phase of the circuit 11 is indicated by the curve $E_{11}$ while the harmonic voltage induced in the winding 40 is indicated by the curve $E_{40}$. It will be noted that the voltage of the winding 40 is a sixth harmonic and the electric valve converting system is a six-phase rectifier. It is possible to operate a twelve-phase rectifier in accordance with my invention with a sixth harmonic control voltage and in this case the switching mechanism controlling the time at which the control members 23 are energized from the winding 40 must be arranged so that successive half-cycles of the harmonic voltage will be impressed on successive electric valves. With the arrangement disclosed, however, successive positive half-cycles only are utilized and with this arrangement the switching operation is facilitated. It is apparent that my invention can be carried out utilizing any suitable harmonic which has a number of half-waves equal to $$\frac{KN}{2}$$

times the half-waves of the alternating current circuit 11 where K is an integer and N is the number of phases of the electric valve converting system. The system provided has numerous advantages from the cost and reliability standpoint, inasmuch as standard rotating equipment may be utilized. The harmonic generator and the synchronous driving motor may both be any standard construction. The distributor mechanism 26 may also be of standard construction. The quadrature field adjustment of the synchronous motor 28 provides a very simple and effective manner of adjusting the phase of the excitation of the immersion-igniter control electrodes so that the voltage or current of the direct current circuit may be controlled, automatically if desired.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, electric translating apparatus connected between said circuits and including a plurality of electric valve means of the type employing an ionizable medium capable of supporting an arc discharge and each comprising an anode, a cathode and an immersion-igniter control member, said electric valve means being arranged to conduct current in succession to form an $n$-phase electric valve converting system, an excitation circuit for energizing the control electrodes of said electric valve means comprising a synchronous generator for generating a harmonic voltage having a frequency of $n$ times the frequency of said alternating current circuit, and mechanical switching means operated synchronously with said harmonic generator to impress alternate half-waves of said harmonic voltage on different ones of said control members in succession.

2. In combination, a pair of circuits, at least one of said circuits being an alternating current circuit, electric translating apparatus connected between said circuits and including a plurality of electric valve means of the type employing an ionizable medium capable of supporting an arc discharge and each comprising an anode, a cathode and an immersion-igniter control member, said electric valve means being connected to provide an $n$-phase electric valve converter, a control circuit for energizing the control electrodes of said electric valve means comprising a source of harmonic voltage having a frequency equal to $n$ times the frequency of said alternating current circuit, and means for impressing alternate half-waves of said harmonic voltage on successive ones of said control electrodes to render said electric valve means conductive in succession.

3. In combination, a pair of circuits, at least one of said circuits being an alternating current circuit, electric translating apparatus connected between said circuits and including a plurality of electric valve means of the type employing an ionizable medium capable of supporting an arc discharge and each comprising an anode, a cathode and an immersion-igniter control member, said electric valve means being connected to form an $n$-phase electric valve converting system, a control circuit for rendering said electric discharge valve means conductive in succession comprising a single-phase source of harmonic voltage having a frequency equal to at least $$\frac{n}{2}$$

times the frequency of said alternating current circuit, and mechanical switching means for completing a circuit between said source of harmonic voltage and each of said control members in succession, each of said circuits being completed for the duration of one half-cycle of said harmonic voltage.

4. In combination, an alternating circuit, a direct current circuit, electric translating apparatus connected between said circuits and including a plurality of electric valve means of the type employing an ionizable medium capable of supporting an arc discharge and each comprising an anode, a cathode and a control member, said electric valve means being arranged to conduct current in succession to form an $n$-phase electric valve converting system, an excitation circuit for energizing the control electrodes of said electric valve means comprising a synchronous generator providing a single-phase source of harmonic voltage having a frequency equal to at least $$\frac{n}{2}$$

times the frequency of said alternating current circuit, and means for impressing selected different half-waves of said harmonic voltage on the control members of said electric valve means in succession in the order in which they are to be rendered conductive.

5. In combination, an alternating current circuit, a direct current circuit, electric translating apparatus connected between said circuits and including a plurality of electric valve means of a type employing an ionizable medium capable of supporting an arc discharge and each comprising an anode, a cathode and an immersion-igniter control member, a synchronous generator having a single-phase armature winding for producing a voltage which is a harmonic of the voltage of said alternating current circuit, and switching means operating in synchronism with said synchronous generator for impressing predetermined halfwaves of said harmonic voltage on the control members of successive ones of said valves to render said valves conductive in a predetermined sequence.

6. In combination, an alternating current supply circuit, a direct current load circuit, an $n$-phase electric valve rectifying system interconnecting said circuits including a plurality of electric valve means of the type employing an ionizable medium capable of supporting an arc discharge and each comprising an anode, a cathode and an immersion-igniter control member, a control circuit for controlling the conductivities of said electric valve means including a synchronous type generator having a single-phase armature winding for producing a harmonic voltage having a frequency at least $$\frac{n}{2}$$

times the frequency of said alternating current supply circuit, and electric switching means for connecting successively the control electrodes of said electric valve means with said armature winding to impress thereon predetermined half-waves of said harmonic voltage.

7. In combination, an alternating current circuit, a direct current circuit, electric translating apparatus connected between said circuits and including a plurality of electric valve means of the type employing an ionizable medium capable of supporting an arc discharge and each comprising an anode, a cathode and an immersion-igniter control member, a synchronous motor energized from said alternating current circuit, said valve means being connected to form an $n$-phase electric valve converter, a synchronous type generator driven by said synchronous motor, said synchronous generator having a single-phase armature winding and a field structure having a number of poles dependent upon the number of phases of said electric translating apparatus to produce an $n$ harmonic voltage in said single-phase winding, mechanical distributor means driven by said synchronous motor for controlling the application of the voltage of said armature winding to said control electrodes, said distributor being arranged to impress alternate half-waves of said harmonic voltage on different ones of said control electrodes and for impressing every $n$th alternate half-wave on the same control electrode.

CARL C. HERSKIND.